Oct. 18, 1960          J. F. PRIBONIC          2,956,816
TWO-POSITION AIR SUSPENSION CONTROL VALVE
Filed Nov. 28, 1958                    3 Sheets-Sheet 1

INVENTOR.
JOHN F. PRIBONIC
BY D. C. Staley
HIS ATTORNEY

Oct. 18, 1960 J. F. PRIBONIC 2,956,816
TWO-POSITION AIR SUSPENSION CONTROL VALVE
Filed Nov. 28, 1958 3 Sheets-Sheet 2
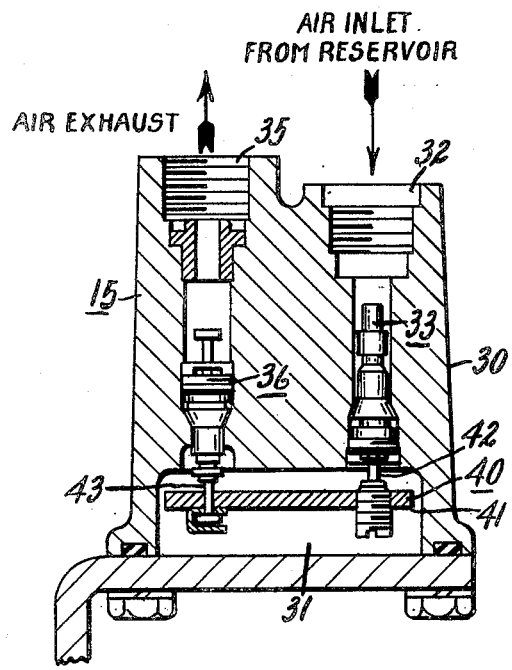
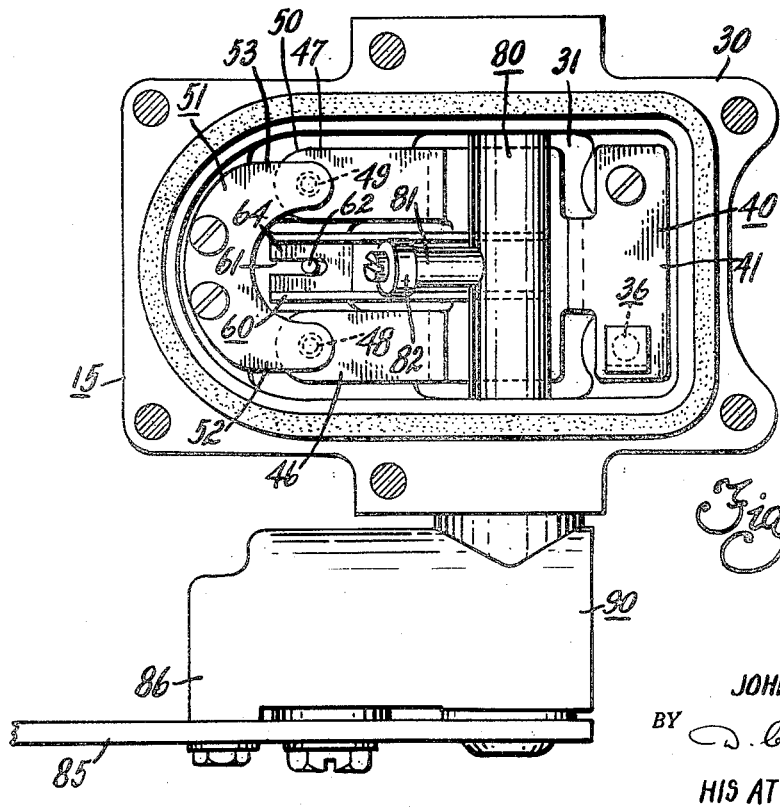
INVENTOR.
JOHN F. PRIBONIC
BY D. C. Staley
HIS ATTORNEY

United States Patent Office 2,956,816
Patented Oct. 18, 1960

2,956,816

TWO-POSITION AIR SUSPENSION CONTROL VALVE

John F. Pribonic, Dayton, Ohio, assignor to General Motors Corporation, Detroit, Mich., a corporation of Delaware Filed Nov. 28, 1958, Ser. No. 776,780

7 Claims. (Cl. 280—124)

This invention relates to control valves adapted to regulate the supply and exhaust of air to and from an air spring of an air suspension system to regulate the clearance height between the sprung mass and the unsprung mass of a vehicle to establish and maintain a relatively predetermined clearance height between the sprung mass and the unsprung mass. The use of air springs to replace conventional steel springs between the sprung mass and the unsprung mass of a vehicle to support the chassis and body of the vehicle upon a running gear is now well known in the art. These air springs consist of an expansible chamber that receives air under pressure of a value suitable to support the chassis of a vehicle upon the running gear, utilizing the air of the air spring as the resilient means for support of the body upon the running gear of the vehicle.

To establish a predetermined clearance height between the sprung mass, that is the body of the vehicle, and the unsprung mass, that is the running gear of the vehicle, the air springs receive air under pressure from a suitable source of pressure supplied on the vehicle sufficient to support the static load of the body upon the running gear at a predetermined clearance height relative to the running gear.

To maintain the clearance height between the sprung mass and the unsprung mass at a relatively constant value, control valves are provided for supplying or regulating the air under pressure to the air springs and exhausting air from the air springs in response to change in clearance height between the sprung mass and the unsprung mass of the vehicle. These control valves are conventionally carried on the chassis or body of the vehicle with suitable linkage connecting the control valves with the running gear of the vehicle so that internal valve mechanism within the control valve will be actuated upon a change of clearance height between the body and the running gear of the vehicle to supply air to the air springs when the predetermined clearance height is decreased for any reason, such as an increase of load in the body of the vehicle, or loss of air from the air springs. Similarly, the control valves exhaust air from the air springs when the load within the body of the vehicle is decreased, whereby a relatively constant clearance height is established between the chassis of the vehicle and the running gear.

There are conditions, however, under which a predetermined clearance height between the body and running gear of the vehicle is not satisfactory to meet particular conditions, such as when placing a low-slung vehicle on a grease rack of an old style, or when operating such a vehicle over highly crowned or rutted roads. The low road clearance given to modern vehicles creates this problem, which is somewhat amplified by vehicles using air suspension systems because of the tendency to decrease the clearance height between the sprung mass and the unsprung mass of the vehicle when using air suspension systems. This is for the reason that it is possible with air suspension systems to maintain the clearance height between the sprung mass and the unsprung mass at a relatively constant value under any load condition.

It is, therefore, desirable to have a control valve for regulating the supply and exhaust of air to and from an air spring that is capable of establishing and maintaining one predetermined clearance height between the sprung mass and the unsprung mass of a vehicle when operating under normal road conditions, that is road conditions which allow for a relatively low road clearance, which control valve is adapted to have the operating characteristics changed so as to establish and maintain a second predetermined clearance height between the sprung mass and the unsprung mass of the vehicle, that is above the normally maintained clearance height, when the vehicle encounters adverse road conditions or when placing the vehicle on an old-style grease rack. Such a temporary increase in clearance height is also desirable when changing a tire on the vehicle to be able to lift the body of the vehicle to a height above normal clearance height during the period of tire change.

It is, therefore, an object of this invention to provide a control valve for regulating the supply and exhaust of air to and from an air spring of an air suspension system wherein the control valve is constructed and arranged so as to provide for two selective operating conditions which establish and maintain two different values of predetermined clearance height between the sprung mass and the unsprung mass of the vehicle, the operator of the vehicle having control over the control valve so as to position it in one or the other of its selective operating positions to change the clearance height between the sprung mass and the unsprung mass of the vehicle from a normally maintained clearance height to one substantially above normal and to be able to return the control valve to either of its selective positions after being changed from one to the other.

It is a further object of this invention to provide a control valve for regulating the supply and exhaust of air to and from an air spring of an air suspension system wherein the control valve includes an operating lever system comprising a plurality of levers functioning as parallel acting lever means with the angular relationship between the lever means having one predetermined operating relationship relative to an actuating lever to maintain and establish one predetermined clearance height between the sprung mass and the unsprung mass of the vehicle, the control valve being so arranged that the pivot points for the parallel acting lever system can be changed relative one to the other and thereby change the angular relationship between the levers of the lever system and relative to the actuating device for the lever system wherein the operating characteristics of the control valve are changed so as to produce a second predetermined clearance height between the sprung mass and the unsprung mass of the vehicle that is above the normally first mentioned maintained clearance height, the movement of the pivots for the lever system being under control of the operator of the vehicle by moving one of the pivots relative to the others to change the angular relationship of the levers of the lever system and thereby change the operating characteristics of the control valve.

Further objects and advantages of the present invention will be apparent from the following description, reference being had to the accompanying drawing wherein preferred embodiments of the invention are clearly shown.

In the drawings:

Figure 3 is a cross-sectional view taken along line 3—3 of Figure 2.

Figure 4 is a cross-sectional view taken along line 4—4 of Figure 2.

Figure 1:
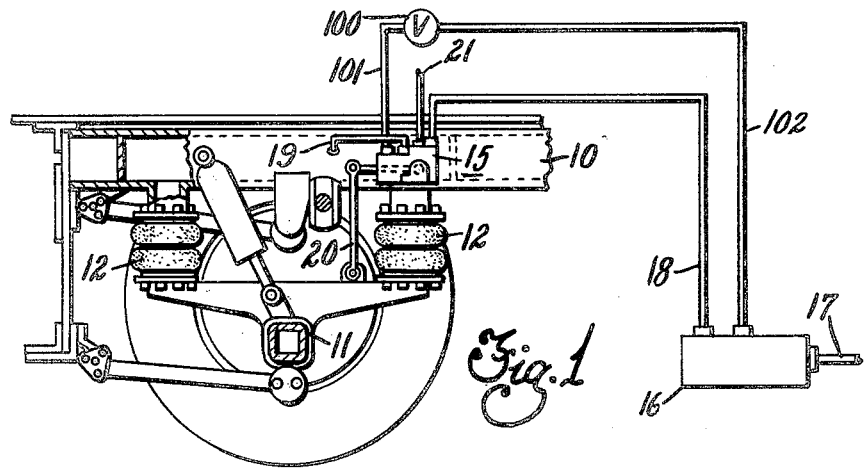
Figure 1 is a schematic view of an air suspension system on a motor vehicle incorporating a valve constructed in accordance with this invention.

In the schematic illustration of Figure 1, the vehicle consists of a chassis frame 10 or sprung mass that is supported upon the axle structure 11, or unsprung mass of the vehicle, by means of the fluid springs or air springs 12. The air springs 12 are conventionally of an expansible character and preferably are expansible bellows type of units adapted to receive air under pressure sufficient to normally support the load of the chassis 10 upon the axle structure 11. When the load in the sprung mass, that is the chassis of the vehicle, is increased, air under pressure is supplied to the air springs 12 to offset the increase in load and thereby maintain the clearance height between the sprung mass and the unsprung mass at a relatively constant value. Similarly, when the load in the vehicle decreases, air is exhausted from the air springs 12 to again compensate for the decrease of load to maintain the clearance height at the relatively constant value.

The clearance height between the sprung mass 10 and the unsprung mass 11 is regulated and established by means of an air control valve 15 that is carried on the chassis 10 of the vehicle. The control valve 15 is provided with an inlet valve member that connects with a source of air pressure maintained in the reservoir 16, a line 17 connecting the reservoir with a suitable source of pressure such as an air compressor, not shown, driven by the engine of the vehicle. Air pressure of a predetermined value is maintained in the reservoir 16, the air under pressure being supplied through the line 18 to the control valve 15.

The control valve 15 is connected with the air springs 12 by means of a fluid supply line 19 through which air under pressure is conducted to the air springs when the air inlet valve in the control valve 15 is actuated by the linkage 20 that connects the valve 15 with the axle 11 of the vehicle so that the valve 15 responds to a change in clearance height between the chassis and the axle of the vehicle.

Thus, when the load in the vehicle increases, tending to compress the air springs 12, the linkage 20 will operate the inlet valve member of the control valve 15 to supply air under pressure to the air springs 12 from the reservoir 16 and thereby compensate for the increase in load. Similarly, when the load decreases in the vehicle, the linkage 20 operates an exhaust valve member in the control valve 15 to allow air under pressure to exhaust back through the line 19 to the control valve 15 and thence through the exhaust line 21 to atmosphere or to a suitable low-pressure tank, not shown, whereby the clearance between the sprung mass and the unsprung mass is retained at a relatively constant value.

Air control or regulating valves supplying air to an air spring and exhausting air therefrom in response to change in clearance height between the sprung mass and the unsprung mass of the vehicle are relatively well known in the art, such valves being adapted to maintain one selected predetermined clearance height between the sprung mass and the unsprung mass of the vehicle.

However, the control valve 15 of this invention is constructed and arranged in a manner that it has two selective operating positions in which it can maintain selectively two clearance height values, of different value, between the sprung mass and the unsprung mass of the vehicle. Thus, the control valve 15 is capable of maintaining a first normal predetermined clearance height that provides the vehicle with a low road clearance when operating over normal road conditions. The control valve 15 is adapted to be under control of the operator of the vehicle so that when the vehicle operates over adverse roads that are deeply rutted, or when the low-slung vehicle is placed on an old-style grease rack, the operator of the vehicle can change the operating characteristic of of the control valve so as to effect a change in the normally established clearance height between the sprung mass and the unsprung mass of the vehicle to elevate the vehicle to a position above the normally maintained clearance height and thereafter maintain the vehicle at that clearance height so long as the operator leaves the control in the selected position.

As more particularly shown, in Figures 2 to 5 inclusive, the control valve consists of a body 30 forming a chamber 31 that houses the lever actuating system of the control valve. The housing 30 has an air inlet port 32 with which the air inlet line 18 connects between the reservoir 16 and the valve 15. A control valve 33 of a conventional tire-type valve is placed in the inlet passage 32 and controls the inlet flow of air from the inlet line 18 into the chamber 31 in a manner hereinafter more fully described.

The valve body 30 is also provided with an exhaust port 35 that connects with the exhaust line 21, air under pressure being under control of the valve 36 to regulate the exhaust of air from the chamber 31 to the line 21. The valves 33 and 36 thus control the flow of air pressure into the chamber 31 and exhaust of air pressure from the chamber 31 depending upon which of these valves is open.

An outlet port 38 is in fluid connection with the chamber 31, this port 38 being connected with the line 19 for supply of air to the air springs 12 when the inlet valve 33 is open and to provide for exhaust of air from the air springs 12 when the exhaust valve 36 is open.

The inlet valve 33 and the exhaust valve 36 are operated by a lever 40 that has the platform end 41 positioned to engage one of the valves 33 and 36, as illustrated in Figure 3. When the platform end 41 moves upwardly against the stem 42 of the valve 33, the inlet valve will be open to allow air under pressure to flow into the chamber 31 and then into the port 38 for supply of air under pressure to the air springs. When the platform end 41 moves in a downward direction, the stem 43 of the valve 36 is moved downwardly to open this exhaust valve and allow air under pressure to exhaust from the air springs back to the port 38 to the chamber 31 and thence to the exhaust line 21.

Figure 2:
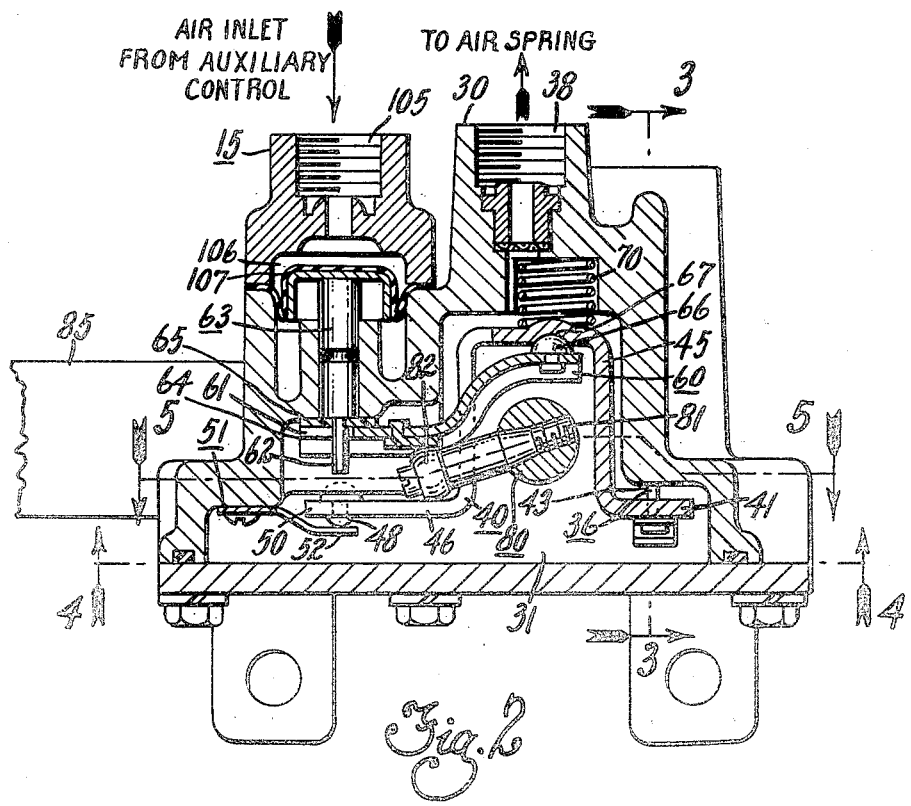
Figure 2 is a vertical cross-sectional view of the control valve.
Figure 5:
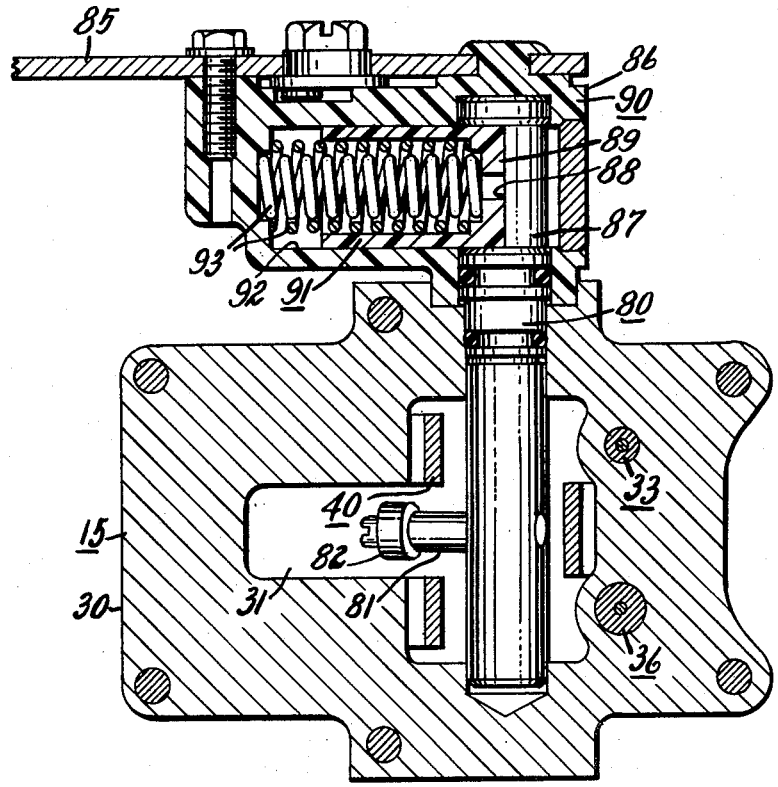
Figure 5 is a cross-sectional view taken along line 5—5 of Figure 2.

The lever 40 has a U-shaped portion 45, as shown in Figure 2, which terminates in a pair of leg portions 46 and 47, as shown in Figure 4. Each of these leg portions 46 and 47 have pivot members 48 and 49 respectively pivoting this end of the lever upon the body 30 of the control valve. These pivot members 48 and 49 consist of small buttons that are positioned on one side of the respective legs 46 and 47 to engage corresponding recesses in the body of the valve 30 to form a stationary pivot point for the lever 40 at one end of the lever, the opposite end of the lever being a platform end 41 that engages and actuates the valves 33 and 36. The pivot end 50 of the lever 40 is retained in its pivot position, that is the pivot buttons 48 and 49 are retained in their respective recesses in the body 30 by means of the spring 51 having the legs 52 and 53 that engage the projecting ends of the pivot buttons to hold the end 50 of the lever in position, as shown in Figure 2 and Figure 4.

The lever 40 is operated by a second lever 60 that has a slot 61 in one end thereof that fits over the stem 62 of a movable member 63, the function of which member 63 is hereinafter more fully described. With the end 64 of the lever 60 being placed over the stem 62 of the member 63, the lever is thereby pivoted on the member 65 on the valve body, the opposite end of the lever 60 having a pivot button 66 that seats in a recess 67 in the lever 40 in the upper end of the U-shaped portion thereof, as shown in Figure 2, whereby movement of the lever 60 about its pivot 65 will cause movement of the lever 40 about its pivots 48 and 49 to actuate the valves 33 and 36.

A compression spring 70 contained in the body 30 urges the lever 40 downwardly against the pivot 66 so as to insure engagement between these levers and normally urge the lever 40 downwardly in a direction to normally urge the platform 41 to open the exhaust valve 36.

The levers 40 and 60 are disposed somewhat in parallel relationship and act as a parallel lever system so that movement of the lever 60 will operate lever 40, the two levers being normally in a predetermined angular relationship so as to establish one predetermined operating characteristic of the control valve by which the valve maintains one predetermined clearance height between the sprung mass and the unsprung mass of the vehicle. It will be apparent that if pivot points for the two levers are changed relative one to the other, the angular relationship between the two levers will be changed and thereby the operating characteristic of the control valve will be changed, which, in turn, will cause the valve to establish and maintain a second and different predetermined clearance height between the sprung mass and the unsprung mass of the vahicle.

An actuating member consisting of a shaft 80 is journaled in the body 30 of the control valve. This shaft 80 has an actuating member 81 carried radially therefrom with a head 82 engaging the lever 60 so as to urge the lever upwardly and thereby operate the lever system consisting of the lever 60 and the lever 40. The shaft 80 projects exteriorly of the body 30 of the control valve and has an overtravel mechanism 90 secured on the end thereof. This overtravel mechanism is adapted to allow the axle of the vehicle to move a greater distance than is moved by the operating end 41 of the lever 40 to operate the valves 33 and 36. Obviously, the movement required to actuate these valves is considerably less than the normal vertical movement of the axle of the vehicle relative to the body of the vehicle when operating under normal road conditions. This overtravel mechanism permits the greater movement of the axle of the vehicle without transmission of this movement to the control valves 33 and 36.

The linkage 20 between the control valve 15 and the axle structure 11 includes the oscillating arm 85 that is secured to the body 86 of the overtravel mechanism. This body 86 is journaled on the extending end 87 of the actuating shaft 80. The end 87 of the shaft has a flat portion 88 that is engaged by the head 89 of a piston 91 that is reciprocable in the bore 92 in the body 86 of the overtravel mechanism. The piston 91 is normally held in engagement with the flat side 88 on the shaft 80 by means of the compression springs 93. It will be apparent that with the shaft 80 being held to a limited movement internally within the body of the control valve, the oscillating arm 85 can have a greater stroke of movement than is given to the shaft 80, the differential in movement being taken up by the movement of the piston 91 within the body 86 of the overtravel mechanism.

From the foregoing description, it will be apparent that when the chassis of the vehicle supporting the control valve 15 moves downwardly, the shaft 80 will be rotated in a clockwise direction, as viewed in Figure 2, to cause the lever 81 to move the lever 60 upwardly about its pivot 65 and thereby move the lever 40 upwardly about its pivots 48 and 49 to open the inlet valve 33 to allow air under pressure to be admitted to the air springs 12 and correct for the increased load that has caused the downward movement of the chassis of the vehicle. Similarly, when the chassis of the vehicle moves upwardly, representing a decrease in load in the vehicle, the valve 30 moving upwardly with the chassis will cause counterclockwise rotation of the shaft 80 so that the radially extending end 81 of the shaft 80 will move in a counterclockwise direction to allow the lever 60 to pivot downwardly about its pivot 65 by action of the spring 70 and thereby allow the arm 40 to move downwardly about its pivots 48 and 49 also by action of the spring 70 to open the exhaust valve 36 and allow air under pressure to escape from the air springs to correct for the decrease in load until the chassis of the vehicle has returned to its normally maintained predetermined clearance height.

The foregoing operation of the valve that has just been described is a conventional operation in establishing and maintaining a predetermined clearance height between the sprung mass and the unsprung mass of a vehicle.

However, the control valve of this invention has the movable member 63 under control of the operator of the vehicle so as to change the pivot point 65 of the lever 60 relative to the pivots 48 and 49 of the lever 40. Such a change of the location of the pivot 65 relative to the pivots 48 and 49 will change the angular relationship between the levers 60 and 40 and will also change the angular relationship of the lever 60 relative to the actuating arm 81.

Assuming the vehicle to be at a predetermined clearance height with the lever system of the control valve in the position shown in Figure 2, that is in neutral position with neither exhaust valve nor inlet valve open, when the movable member 63 is moved downwardly toward the pivots 48 and 49 of the lever 40, the lever 60 will tend to pivot about the head 82 of the radial extension 81 on the shaft 80 since at this time the shaft 80 cannot turn because the arm 85 is connected with the axle of the vehicle so that the radial extension 81 of the shaft 80, in effect, becomes a rigid pivot about which the arm 60 will rotate with the left-hand end of the lever 60 moving downwardly while the right-hand end of the lever 60 moves upwardly. This upward movement of the right-hand end of the lever 60 will cause the lever 40 to be rotated in a counterclockwise direction, that is upwardly, about is pivots 48 and 49 to open the inlet valve 33 and admit air into the air springs to raise the chassis of the vehicle above the normally maintained predetermined clearance height to a clearance height of increased value until such time as the upward movement of the valve will allow rotation of the arm 81 in a counterclockwise direction to permit closing of the inlet valve 33.

This movement of the member 63 downwardly to change the pivot 65 of the lever 60 relative to the lever 40 which changes the angular relationship between these levers and changes the angular relationship between the lever system and the actuating member 81 produces an effect on the control valve to change its operating characteristic to thereby establish and maintain a new or second predetermined clearance height that is substantially above the normally maintained predetermined clearance height.

Movement of the member 63 is under control of the operator of the vehicle by control of the manually operated valve 100, see Figure 1, to supply air through the line 101 that is received from the reservoir 16 through the line 102, the line 101 connecting with the inlet port 105 in the body 30 of the control valve 15. The air under pressure supplied to the inlet port 105 enters the chamber 106 and acts on the diaphragm 107 to move the member 63 downwardly to effect the change of the angular relationship between the lever system heretofore described. The lever system will be maintained in its repositioned angular relationship so long as air under pressure is retained in the chamber 106 so that the control valve will operate in the newly selected condition at the will of the operator of the vehicle.

Whenever the operator of the vehicle desires to lower the chassis relative to the axle to the normal predetermined clearance, air will be exhausted from the chamber 106 to allow the left-hand end of the lever 60 to again rest on the pivot 65 to re-establish the first angular relationship between the levers 40 and 60 and thereby reestablish and maintain the normal predetermined clearance height between the sprung mass and the unsprung mass of the vehicle.

While the embodiments of the invention as herein disclosed constitute preferred forms, it is to be understood that other forms might be adopted.

What is claimed is as follows:

1. A height control valve or leveling valve for use in a fluid suspension system of a vehicle to maintain multiple positions of predetermined clearance height of different value between the sprung mass and the unsprung mass of a vehicle, said control valve comprising, inlet and exhaust valve means controlling flow of fluid to and from a fluid suspension means, a pair of parallel acting lever means having predetermined angular relationship each pivotally supported at one end thereof and operable concurrently with one of the lever means in actuating connection with said valve means to operate the same in establishing and maintaining one predetermined clearance height value between the sprung mass and the unsprung mass of the vehicle, actuating means responsive to change in clearance height from a predetermined value connected with said lever means to actuate the same to operate said valve means thereby in maintaining a clearance height of predetermined value, and means acting on at least one of said levers to change the position of the pivot axis of one of the lever means relative to the pivot axis of the other lever means whereby to change thereby the angular relationship between the lever means and thereby change the angular relationship relative to said actuating means to change the operating characteristics of the control valve to establish and maintain thereby a predetermined clearance height of a second and different value.

2. A height control valve or leveling valve constructed and arranged in accordance with claim 1 in which the means acting on the said one of said lever means to change the position of the pivot axis of the said one lever means relative to the pivot means of the other comprises means responsive to manual actuation by the operator of the vehicle to obtain operator control over the predetermined clearance height value at which the said height control valve maintains the sprung mass relative to the unsprung mass of the vehicle.

3. A height control valve or leveling valve for use in a fluid suspension system of a vehicle to maintain multiple positions of predetermined clearance height of different value between the sprung mass and the unsprung mass of a vehicle, said control valve comprising, inlet and exhaust valve means controlling flow of fluid to and from a fluid suspension means, first lever means pivotally supported at one end for oscillatable movement and connected with said inlet and exhaust valve means at the other end to actuate the same by the oscillation of the said lever means to establish and maintain one predetermined clearance height between the sprung mass and the unsprung mass of the vehicle, second lever means pivotally supported at one end for oscillatable movement and connected at the other end with said first lever means between opposite ends thereof to effect oscillation of the first lever means by oscillation of said second lever means, said first and second lever means being movable concurrently in predetermined angular relationship to establish said first operating characteristic of the control valve which establishes and maintains a first predetermined clearance height between the sprung mass and the unsprung mass of the vehicle, actuating means responsive to change in clearance height between the sprung mass and the unsprung mass of the vehicle operably connected with said lever means to actuate the same, and means operatively connected with the said lever means to change the pivot axis of one of the lever means relative to the pivot axis of the other lever means to change thereby the angular relationship between the said first and second lever means and thereby relative to said actuating means whereby to change the operating characteristic of the control valve to establish and maintain a second predetermined clearance height of different value between the sprung mass and the unsprung mass of the vehicle.

4. A height control valve or leveling valve for use in a fluid suspension system of a vehicle to maintain multiple positions of predetermined clearance height of different value between the sprung mass and the unsprung mass of a vehicle, said control valve comprising, inlet and exhaust valve means controlling flow of fluid to and from a fluid suspension means, first lever means pivotally supported at one end thereof for oscillatable movement and connected at the opposite end of the lever means with said inlet and exhaust valve means to actuate the same by the oscillation of the lever means to establish and maintain one predetermined clearance height between the sprung mass and the unsprung mass of the vehicle, second lever means pivotally supported at one end thereof for oscillatable movement and operatively connected with said first lever means by engagement of said second lever means with said first lever means at a point between the opposite ends of the first lever means whereby to effect oscillation of the first lever means by oscillation of said second lever means, said first and second lever means being movable concurrently in predetermined angular relationship to establish a first operating characteristic of the control valve to establish and maintain a first predetermined clearance height between the sprung mass and the unsprung mass of the vehicle, actuating means responsive to change in clearance height between the sprung mass and the unsprung mass of the vehicle operatively connected with said second lever means to actuate the same, and thereby actuate said first lever means to operate said inlet and exhaust valve means, and means connected with said second lever means to change the position of the pivot means of the second lever means relative to the pivot means of the first lever means to change the angular relationship between the first and second lever means and thereby change the angular relationship relative to said actuating means whereby to change the operating characteristic of the control valve to establish and maintain a second predetermined clearance height of a different value.

5. A height control valve or leveling valve constructed and arranged in accordance with claim 4 in which the pivot means for the said second lever means comprises a movable member having one position to establish one predetermined angular relationship between the first and second lever means and a second position which establishes a second angular relationship between the said lever means, whereby to change the operating characteristic of the control valve from one operating condition to a second operating condition.

6. A height control valve or leveling valve for use in a fluid suspension system of a vehicle to maintain multiple positions of predetermined clearance height of different value between the sprung mass and the unsprung mass of the vehicle, said control valve comprising, inlet and exhaust valve means controlling flow of fluid to and from a fluid suspension means, first lever means having a fixed pivot supporting the said lever means at one end thereof for oscillatable movement and connected with said inlet and exhaust valve means to actuate the same by the oscillation of the said first lever means to establish and maintain thereby one predetermined clearance height between the sprung mass and the unsprung mass of the vehicle, second lever means having a movable pivot supporting the second lever means at one end thereof for oscillatable movement and having the opposite end of the second lever means engaging said first lever means between opposite ends thereof to effect oscillation of the first lever means by oscillation of said second lever means, oscillatable actuating means responsive to change in clearance height between the sprung mass and the unsprung mass of the vehicle engaging said second lever means to actuate the same by oscillation of said actuating means and therethrough actuate said first lever means, said movable pivot for said second lever means having a first position establishing a first predetermined angular relationship between said first and second lever means and relative to said actuating means to establish a first operating characteristic of the control valve to maintain a first predetermined clearance height between the sprung mass and the unsprung mass of the vehicle, said movable pivot for said second lever means also having a second position to establish and maintain a second predetermined angular relationship between said first and second lever means and relative to said actuating means to establish thereby a second operating condition of the control valve to establish and maintain a second and different predetermined clearance height between the sprung mass and the unsprung mass of the vehicle.

7. A height control valve or leveling valve constructed in accordance with claim 6 that includes a movable member responsive to actuation by operator of the vehicle to shift the pivot means of said second lever from its first position to its second position whereby to change the clearance height maintained by the control valve from the first clearance height to the second clearance height under control of the operator of the vehicle.

References Cited in the file of this patent

UNITED STATES PATENTS

| | | |
|---|---|---|
| 2,753,146 | Wiegers | July 3, 1956 |
| 2,820,647 | Jackson | Jan. 21, 1958 |